United States Patent [19]

Sellstrom et al.

[11] Patent Number: 4,514,530

[45] Date of Patent: Apr. 30, 1985

[54] MODIFIED AMINE CURING AGENTS AND EPOXY RESINS CURED THEREWITH

[75] Inventors: Kathy B. Sellstrom; George P. Speranza, both of Austin, Tex.

[73] Assignee: Texaco Inc., White Plains, N.Y.

[21] Appl. No.: 510,695

[22] Filed: Jul. 5, 1983

[51] Int. Cl.$^3$ ............................................. C08L 63/04
[52] U.S. Cl. .................................... 523/456; 524/108; 524/590; 525/454
[58] Field of Search ............... 525/454; 524/108, 590; 523/456

[56] References Cited

U.S. PATENT DOCUMENTS

| | | | |
|---|---|---|---|
| 3,117,940 | 1/1964 | McElroy | 260/2.3 |
| 3,632,530 | 1/1972 | Kinoshita | 260/2.3 |
| 4,036,906 | 7/1977 | Finelli | 525/454 |
| 4,071,482 | 1/1978 | Hopkins, Jr. et al. | 524/108 |
| 4,110,266 | 8/1978 | Sheratte | 260/2.3 |
| 4,139,524 | 2/1979 | Waddill | 528/120 |
| 4,162,358 | 7/1979 | Marquis et al. | 528/120 |
| 4,243,760 | 1/1981 | McDaniel et al. | 521/176 |
| 4,254,069 | 3/1981 | Dominguez et al. | 264/51 |
| 4,267,078 | 5/1981 | Lidy et al. | 260/2.3 |
| 4,273,884 | 6/1981 | Dominguez | 521/114 |
| 4,273,885 | 6/1981 | Dominguez et al. | 521/115 |
| 4,297,444 | 10/1981 | Dominguez et al. | 521/160 |
| 4,301,110 | 11/1981 | Cuscurida et al. | 264/328.14 |
| 4,309,532 | 1/1982 | Cuscurida et al. | 536/4 |
| 4,350,778 | 9/1982 | Dominguez et al. | 521/118 |
| 4,358,547 | 11/1982 | Cuscurida et al. | 521/126 |
| 4,359,540 | 11/1982 | McEntire et al. | 521/129 |
| 4,362,824 | 12/1982 | Dominguez et al. | 521/118 |

FOREIGN PATENT DOCUMENTS 2062660A 5/1981 United Kingdom .
1595431 8/1981 United Kingdom .

OTHER PUBLICATIONS

"Jeffamine ® Polyoxypropylamines" ©1978 Jefferson Chemical Co.
RIM Urethanes, Lloyd, Industrial Research & Development, 1982.
The Reclamation of Flexible Polyurethane Foam, Salloum & Duff, Polym.-Plast. Technol. Eng., 19(1), 1–20 (1982).

*Primary Examiner*—Theodore Pertilla
*Attorney, Agent, or Firm*—Jack H. Park; Kenneth R. Priem

[57] ABSTRACT

In accordance with the present invention an epoxy resin is cured with an amine curative comprising an alkylene carbonate solution of a solid elastomeric polyurethane in admixture with an amine-type curing agent.

22 Claims, No Drawings

MODIFIED AMINE CURING AGENTS AND EPOXY RESINS CURED THEREWITH

BACKGROUND OF THE INVENTION

1. Technical Field of the Invention

This invention relates to curing agents for epoxy resins and more particularly to amines of the type heretofore known for use as curing agents for epoxy resins extended, in accordance with the present invention by the incorporation thereinto of an alkylene carbonate solution of a solid elastomeric polyurethane. The solid elastomeric polyurethane is derived from an essentially difunctional aromatic diisocyanate and a high molecular weight isocyanate-reactive polyether and a difunctional cross linking agent such as a diol or a diamine. The resulting composition is used to cure epoxy resins of the type heretofore known in the art.

2. Prior Art

It is known to use amines such as aliphatic or aromatic amines for the curing of epoxy resins as shown, for example in Waddill U.S. Pat. No. 4,139,524 and Marquis et al. U.S. Pat. No. 4,162,358. See also, the textbook "Handbook to Epoxy Resins" by H. Lee and K. Neville. There is significant technical literature on this subject as illustrated, for example by a technical brochure entitled "Jeffamine ® Polyoxypropyleneamines", Copyright 1978 by Jefferson Chemical Company, Inc.

An extensive body of technical knowledge has arisen relating to the preparation of essentially solid polyurethane elastomers. See, for example, Vols. I and II of "Polyurethane Chemistry and Technology" by James H. Sanders and Kurt C. Frisch, Intersciena Publishers, 1962 and 964. One such group of elastomers is frequently referred to as RIM polyurethanes. This is an art-recognized term because RIM is an acronym for "Reaction Injection Molding", which is not a material, but rather, a process for molding polyurethanes. In the reaction injection molding (RIM) process two highly reactive streams of chemicals are brought together under high pressure (i.e., 2000 psi) in a small mixing chamber where the streams are impingement mixed by being sprayed directly into each other. The mixed material flows immediately into a warm mold where the chemical reaction is completed and the part is cured. The resultant elastomeric polyurethane will contain small pores and voids so that it is not, technically speaking, a voidless solid material. For example it can be calculated that the theoretical density for a polyurethane elastomer should be about 70 pounds per cubic foot. Normally, RIM elastomers based upon polyurethanes will have a density in the order of magnitude of about 60 pounds per cubic foot. The RIM process and the raw materials used therein are described in greater detail in the text "Reaction Injection Molding" edited by Walter E. Becker, VanNostrand Rienhold Publishers, 1979.

In reaction injection molding, one of the two streams referred to above is the essentially difunctional aromatic diisocyanate stream.

The other stream is a stream containing a high molecular weight isocyanate reactive polyether based on propylene oxide, a cross linker such as a diol or a diamine and other conventional additives.

A representative list of U.S. patents directed to the preparation of RIM-polyurethanes includes, for example McDaniel et al. U.S. Pat. No. 4,243,760, Dominguez et al. U.S. Pat. No. 4,254,069, Dominguez U.S. Pat. No. 4,273,884, Dominguez et al. U.S. Pat. No. 4,273,885, Gilbert et al. U.S. Pat. No. 4,297,444, Cuscurida et al. U.S. Pat. No. 4,301,110, Cuscurida et al. U.S. Pat. No. 4,309,532, Dominguez et al. U.S. Pat. No. 4,350,778, and McEntire et al. U.S. Pat. No. 4,359,540. Also, Cuscurida et al. U.S. Pat. No. 4,358,547 and Dominguez et al. U.S. Pat. No. 4,362,824.

Solid elastomeric polyurethanes such as RIM polyurethanes are normally used as utilitarian articles such as body parts for automobiles, etc. The resultant scrap and defective moldings present a serious disposal problem. For example an article "The Reclamation of Flexible Polyurethane Foam" found in the Polymer-Plas. Technol. Eng., 19(1), 1–20 (1982), discloses various techniques that have been conceived insofar as the reclamation of highly porous, low density flexible polyurethane foam is concerned. Reclamation of high density polyurethane elastomers presents special problems because of the strength and durability of the materials involved.

Among the techniques for reclamation mentioned in this article is the use of a glycol or an amine as a solvent. As another example, in Lidy et al. U.S. Pat. No. 4,267,078, a process for disposing of scrap polyurethane is disclosed which involves comminuting the polyurethane and reacting it with an alkylene oxide to form a product that can be used to form additional foamed polyurethane. British specification No. 1,595,431 discloses a method wherein a polyurethane is comminuted, melted and then molded into elastomeric polyurethane products such as shoe soles. U.K. patent application No. 2,062,660A is directed to a reclaiming method wherein the polyurethane is heated in the presence of a compound capable of generating ammonia gas on decomposition in order to provide a degredation product.

SUMMARY OF THE INVENTION

In one aspect the present invention is directed to modified (i.e., extended) amine curing agents which are prepared by treating an alkylene carbonate solution of a solid elastomeric polyurethane such as a RIM polyurethane with an amine of the type used for curing epoxy resins. The alkylene carbonate solution of the RIM polyurethane can be prepared by comminuting the RIM polyurethane and adding this to the alkylene carbonate at an elevated temperature such as a temperature within the range of about 100° to about 200° C. This solution is then added to the amine curing agent to form an epoxy resin curing composition.

When the solution of the RIM polyurethane in the amine is cooled, it sometimes happens that phase separation into a plurality of liquid phases will occur. This is a function of the amine used as a solvent and also of the concentration of RIM polyurethane in the amine solution. Phase separation is not detrimental to the overall utility of the extended amine curative since the amine curing agent and epoxy starting material are normally mixed with agitation at the time of use.

In another aspect the present invention is directed to the use of extended amine curing agents for curing epoxy resins.

DETAILED DESCRIPTION

The principal components of the compositions and methods of the present invention are the epoxy resin, the amine curing agent and the alkylene carbonate solution of a solid elastomeric polyurethane that is treated with the amine.

EPOXIDE STARTING MATERIALS

Generally the vicinal epoxide compositions that can be cured using the curing agents of this invention are organic materials having an average of more than one reactive 1,2-epoxide group. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, halogenated phenyl groups and the like.

The most widely used epoxy resins are diglycidyl ethers of bisphenol A:

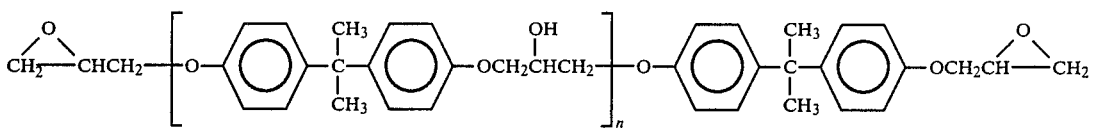

n can represent a number from 0 to 5.

However, these epoxides are representative of the broader class of epoxide compounds that are useful in making epoxy resins.

A widely used class of polyepoxides that can be cured according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4′-isopropylidene bisphenol, 2,4′-dihydroxydiphenylethylmethane, 3,3′-dihydroxydiphenyldiethylmethane, 3,4′-dihydroxydiphenylmethylpropylmethane, 2,3′-dihydroxydiphenylethylphenylmethane, 4,4′-dihydroxydiphenylmethane, 4,4′-dihydroxydiphenylbutylphenylmethane, 2,2′-dihydroxydiphenylditolylmethane, 4,4′-dihydroxydiphenyltolylmethyl-methane and the like. Other polyhydric phenols which may also be co-reacted with an epihalohydrin to provide these epoxy polyethers are such compounds as resorcinol, hydroquinone, substituted hydroquinones, e.g., tert-butylhydroquinone, and the like.

Among the polyhydric alcohols that can be co-reacted with an epihalohydrin to provide the resinous epoxy polyethers are such compounds as ethylene glycol, propylene glycol, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2′-, 3,3′-tetrahydroxydipropylsulfide and the like, mercapto alcohols such as α-monothioglycerol, α,α′-dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides that can be cured by means of the above-described curing agents includes the epoxy novolac resins obtained by reacting, preferably, in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K. "Handbook of Epoxy Resins".

It will be appreciated by those skilled in the art that the polyepoxide compositions that can be cured according to the practice of the present invention are not limited to the above described polyepoxides, but that these polyepoxides are to be considered merely as being representative of the class of polyepoxides as a whole.

The amount of curing agent that is employed in curing polyepoxide compositions will depend on the amine equivalent weight of the curing agent employed. The total number of equivalents of amine group is preferably from about 0.8 to about 1.2 times the number of epoxide equivalents present in the curable epoxy resin composition with a stoichiometric amount being most preferred.

Various conventionally employed additives can be admixed with these polyepoxide-containing compositions prior to final cure. For example, in certain instances it may be desired to add minor amounts of other co-catalysts, or hardners, along with the curing agent system herein described. Conventional pigments, dyes, fillers, flame retarding agents and other compatible natural and synthetic resins can also be added. Furthermore, known solvents for the polyepoxide materials such as acetone, methyl ethyl ketone, toluene, benzene, xylene, dioxane, methyl isobutyl ketone, dimethylformamide, ethylene glycol monoethyl ether acetate, and the like, can be used if desired, or where necessary.

THE AMINE CURING AGENT

A curable epoxy resin composition is prepared by admixing one or more epoxides, as described above, with an epoxy-interactive polyamine curing agent. The ratio of active amino hydrogens to epoxy groups in the admixture may suitably be in the range of about 0.5–2:1 and, preferably, in the range of about 0.8–1.5:1.

Suitable polyamine curing agents are those that contain more than two active hydrogens per molecule. Examples of such curing agents are alkylene polyamines represented by the formula:

NH$_2$C$_2$H$_4$(NHC$_2$H$_4$)$_n$X where X is —OH or —NH$_2$ and where n has the value of 0 to about 5. When X is —NH$_2$, such alkylene polyamines include ethylene diamine, diethylene triamine, triethylene tetramine, tetraethylene pentamine, pentaethylene hexamine, and the like.

These polyamines provide admixtures having low viscosity and provide epoxy resin compositions that generally have good chemical resistance. When X is —OH, representative amines include

H$_2$NC$_2$H$_4$NHC$_2$H$_4$NHCH$_2$CH$_2$OH,

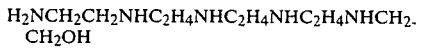

H$_2$NCH$_2$CH$_2$NHC$_2$H$_4$NHC$_2$H$_4$NHC$_2$H$_4$NHCH$_2$CH$_2$OH

Long-chain polyamine adducts such as trimethyl-1,6-hexanediamine may also be used to impart color stability.

Thus, broadly speaking, aromatic, alicyclic, heterocyclic, and aliphatic amines may be used as well as more complex amine compounds such as polyether polyamines, etc. Other examples include N-aminoethylpiperazine, m-phenylenediamine, 2,4- or 2,6-toluenediamine, etc.

Another useful class of amines are amines derived from polyoxypropylene diols and triols.

Thus, we may employ polyoxypropylene diamines of the formula:

$NH_2HC(CH_3)CH_2\text{-}[OCH_2CH(CH_3)]\text{-}xNH_2$ wherein x is an integer of from about 2 to about 40. The most preferred polyoxypropylene diamines of the formula have average molecular weights between about 230 and 2,000, where x is an average of 2.6 to about an average of about 33.1.

Polyoxypropylene triamines that may be used include those having the formula:

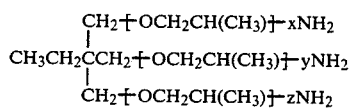

wherein x, y and z represent integers in the range of about 1 to 15, and the sum of x, y and z is from about 3 to about 50. Preferred polyoxypropylene triamines of the above formula have average molecular weights between about 190 to about 3,000. These polyoxypropylene di- and triamines are readily available commercially in a wide variety of molecular weight ranges.

Also useful are amines having the formula:

$H_2NCH(CH_3)CH_2[OCH(CH_3)CH_2]x\text{-}[OCH_2CH_2]y\text{-}[OCH(CH_3)CH_2]zNH_2$ where $x+z$ equals 2 to 10 and y is a number having a value from 1 to 50.

THE ELASTOMERIC (RIM) POLYURETHANE

As has been heretofore indicated, the elastomeric polyurethanes to be used as extenders in accordance with the present invention are prepared by the reaction of an essentially difunctional aromatic diisocyanate with a high molecular weight isocyanatereactive polyether based on propylene oxide.

The polyols useful in making the polyurethane elastomers of this invention include polyether polyols, polyester diols, triols, tetrols, polyether polyamines, etc., having an equivalent weight of at least 500, and preferably at least 1000 up to about 3000 or more. The polyether polyols based on trihydric initiators of about 4000 molecular weight and above are especially preferred. The polyethers may be prepared from lower alkylene oxides such as ethylene oxide, propylene oxide, butylene oxide or mixtures of propylene oxide, butylene oxide and/or ethylene oxide but propylene oxide should comprise at least about 60 wt. percent of the polyol component. When butylene oxide is used, propylene oxide may be omitted, if desired. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Hydroxyl terminated quasi-prepolymers of polyols and isocyanates are also useful in this invention.

The polyethers and polyesters that may be used are described in greater detail in the textbook edited by W. E. Becker, mentioned above. The use of polyether polyamines is disclosed, for example in Dominguez et al U.S. patent application Ser. No. 371,161 filed Apr. 3, 1982.

The chain-extenders are preferably difunctional and include diols, amino alcohols, diamines or mixtures thereof, such as 1,4-butanediol, ethylene glycol, 1,4-cyclohexane diol, and bis-hydroxyethylhydroquinone, etc. Amide or ester containing diols or amino alcohols, aromatic diamines and aliphatic amines are also suitable as chain-extenders.

A wide variety of aromatic polyisocyanates may be used. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other useful aromatic polyisocyanates are methylene-bridged polyphenyl polyisocyanate mixtures which have a functionality of from about 2 to about 4. See, for example, U.S. Pat. Nos. 2,683,730; 2,950,263; 3,012,008; 3,344,162 and 3,362,979.

The preferred aromatic polyisocyanate is methylene bis(4-phenylisocyanate) or MDI. Pure MDI, quasi-prepolymers of MDI, modified MDI, etc. and other materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. Uretonimine modified pure MDI is included also. This product is made by heating pure distilled MDI in the presence of a catalyst. The liquid product is a mixture of pure MDI and modified MDI:

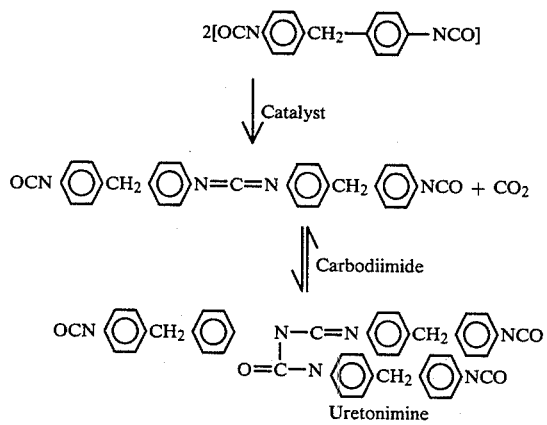

Examples of commercial materials of this type are Upjohn's ISONATE ®125M (pure MDI) and ISONA- TE®143L ("liquid" MDI). Preferably the amount of isocyanates used is the stoichiometric amount based on all the ingredients in the formulation.

Tertiary amines that can be used as catalysts include trialkylamines (e.g., trimethylamine, triethylamine), heterocyclic amines such as N-alkylmorpholines (e.g., N-methylmorpholine, N-ethylmorpholine), dimethyldiaminodiethylether, 1,4-dimethylpiperazine, triethylenediamine, etc., aliphatic polyamines such as N,N,N',N'-tetramethyl-1,3-butanediamine, etc.

It has been found that an improvement in processing characteristics of reaction injection molded (RIM) polyurethanes may be had by the employment of combination catalysts. A combination catalyst may comprise a weak tertiary amine, a fast gelation organo tin catalyst and a delayed action gelation organo tin catalyst. For example, the fast gelation tin catalyst may be dibutyltin dilaurate, the delayed action gelation tin catalyst may be an alkyltin mercaptide such as a commercial product known as FOMREZ®UL-29. The weak tertiary amine may be methyldiethanolamine.

The RIM formulation may include other recognized ingredients such as additional cross-linkers, catalysts, extenders, blowing agents, dyes, chipped or milled glass fibers, chopped or milled carbon fibers and/or other mineral fibers, etc.

PREPARATION OF THE EXTENDED AMINE CURING AGENT

In accordance with the present invention, a polyurethane elastomer such as a RIM elastomer is comminuted and then dissolved in an alkylene carbonate such as ethylene carbonate or propylene carbonate. This is a straight-forward operation that can be performed in any suitable reaction vessel such as an autoclave provided with agitation means and means for heating the contents of the clave. The desired quantity of the alkylene carbonate is placed in the vessel and brought to a desired temperature with agitation normally within the range of about 100° to 200° C., preferably under an inert atmosphere. The temperature to be utilized will be, in part, a function of the temperature at which the urethane elastomer will dissolve. It has been found that this normally will occur at a temperature within the range of about 140° to about 170° C.

This solution is then mixed with an amine curing agent of the type known to those skilled in the art in an amount to give a final epoxy curing formulation having the desired properties. Normally, the final composition will contain about 10 to 30 parts of polyurethane elastomer per 100 parts of amine.

In some situations the resultant solution may tend to separate into two or more layers. This does not present a problem so long as the layers are well mixed before the extended amine is added to the epoxy, as hereafter described. To the contrary, solutions that tend to layer frequently improve the adhesion properties of the resultant epoxy.

It is within the scope of the present invention to use known extenders for amine-based epoxy using systems, for example, synthetic rubber such as a rubbery liquid amine-terminated copolymer of acrylonitrile and butadiene.

SPECIFIC EXAMPLES

EXAMPLE 1

Preparation of an Epoxy Curative Containing RIM Polyurethane in Propylene Carbonate A RIM polyurethane prepared by the reaction of a polyether triol having an average molecular weight of about 6,500, ethylene glycol and a liquid MDI based isocyanate was shredded. Fifty grams of the shredded RIM polyurethane were slowly added to 200 grams of propylene carbonate with agitation in a reaction vessel blanketed with nitrogen while slowly heating the propylene carbonate. The RIM polyurethane was completely dissolved at about 170° C. The solution solidified on cooling.

The solution described above (172 g, 1.35 moles propylene carbonate) was heated to about 60° C. To the reaction kettle were added 277.8 g (2.7 moles) diethylenetriamine (DETA). The nitrogen-padded mixture was held at 100° C. for one hour to ensure complete reaction. The resulting liquid was used to cure an epoxy resin.

EXAMPLE 2

An epoxy resin curing composition (epoxy curative) was prepared by reacting one mole of propylene carbonate with two moles of diethylenetriamine at room temperature (about 25° C.).

EXAMPLE 3

Preparation of Epoxy Curative Containing Ethylene Carbonate and RIM Polyurethane About 50 grams of the RIM polyurethane of Example 1 were slowly added to a stirred reaction vessel blanketed with nitrogen which contained about 200 grams (2.27 moles) of ethylene carbonate while slowly heating the reaction vessel. The RIM polyurethane dissolved in the ethylene carbonate at about 160° C. On cooling to about 130° C., a clear amber-colored solution was formed which was added to about 247 grams (2.4 moles) of diethylenetriamine.

EXAMPLE 4

An epoxy curative similar to that of Example 3 was prepared by reacting about 1 mole of ethylene carbonate with about 1.06 moles of diethylenetriamine at room temperature (about 25° C.).

EXAMPLE 5

Comparison of Cured Epoxy Resin Properties Obtained by Curing the Epoxy Resin at ambient Temperatures For this series of tests a representative commercial epoxy resin was used that can be characterized as a diglycidyl ether of Bisphenol A having an epoxy equivalent weight of about 188. The accelerator used is described in U.S. Pat. No. 4,195,153 and is a mixture of primary, secondary and tertiary amines having an amine equivalent weight of 65.

The compositions prepared, the properties of the compositions and the properties of the cured epoxy resins are given in Table 1.

TABLE 1

Properties of Epoxy Resin Cured at
Ambient Temperatures with
1,2 Alkylene Carbonate.Amine.RIM Curatives

| | Example | | | |
|---|---|---|---|---|
| | 1 5516-42B | 2 5516-43B | 3 5516-53B | 4 5516-54B |
| Formulation, pbw | | | | |
| Epon 828 (WPE 188)* | 100 | 100 | 100 | 100 |
| PrCO$_3$.DETA | — | 16.3 | — | — |
| PrCO$_3$.RIM.DETA | 18 | — | — | — |
| EtCO$_3$.DETA | — | — | — | 20.5 |
| EtCO$_3$.RIM.DETA | — | — | 20.5 | — |
| Accelerator 399 | 5 | 5 | 5 | 5 |
| Exothermic Data | | | | |
| Gel time, min (100 g mass) | 11.9 | 12.2 | 17.8 | 16.9 |
| Peak exothermic temp., °C. | 183.6 | 173.3 | 134.4 | 137.3 |
| Time to peak temp., min | 13.7 | 13.7 | 21.6 | 19.7 |
| Properties of Cured ⅛" Castings:[1] | | | | |
| Shore D hardness, 0–10 sec | 82–80 | 80–78 | 83–80 | 84–80 |
| Ultimate elongation, % | 2.3 | 2.6 | 0.8 | 0.7 |
| Heat deflection temp., °C. 264 psi load/ 66 psi load | 54/57 | 56/58 | 43/47 | 42/44 |
| Izod impact strength, ft-lb/in | 0.14 | 0.11 | 0.12 | 0.08 |
| Tensile strength, psi | 9500 | 9400 | 3200 | 3300 |
| Tensile modulus, psi | 486000 | 494000 | 419000 | 518000 |
| Flexural strength, psi | 18000 | 19700 | 11800 | 9300 |
| Flexural modulus, psi | 544000 | 557000 | 526000 | 567000 |

[1]Cured 7 days ~25° C.
*The equivalent weight of the epoxy resin was about 188. (Shell Chemical Co.)

EXAMPLE 6

Comparison of Cured Epoxy Resin Properties Obtained by Curing the Epoxy Resin at Elevated Temperatures The epoxy resin of Example 5 was cured with the epoxy curatives of Examples 1–4 at elevated temperatures.

The compositions prepared, the properties of the compositions and the properties of the cured epoxy resins are given in Table 2.

TABLE 2

Properties of Epoxy Resin Cured at
Elevated Temperatures with
Alkylene Carbonate.RIM.Amine Curatives

| | Example | | | |
|---|---|---|---|---|
| | 1 5516-42A | 2 5516-43A | 3 5516-53A | 4 5516-54A |
| Formulation, pbw | | | | |
| Epoxy Resin (WPE 188) | 100 | 100 | 100 | 100 |
| PrCO$_3$.DETA | — | 19 | — | — |
| PrCO$_3$.RIM.DETA | 21 | — | — | — |
| EtCO$_3$.DETA | — | — | — | 24 |
| EtCO$_3$.RIM.DETA | — | — | 24 | — |
| Glass transition temp., °C. | 102 | 100.5 | 71.5 | 61.5 |
| Properties of Cured ⅛" Castings:[1] | | | | |
| Shore D hardness, 0–10 sec | 80–79 | 82–80 | 80–77 | 79–77 |
| Ultimate elongation, % | 4.1 | 3.8 | 2.3 | 1.5 |
| Heat deflection temp., °C. 264 psi load/ 66 psi load | 89/99 | 85/92 | 55/60 | 54.5/60.5 |
| Izod impact strength, ft-lb/in | 0.15 | 0.24 | 0.14 | 0.16 |
| Tensile strength, psi | 10700 | 11700 | 9800 | 7300 |
| Tensile modulus, psi | 452000 | 471000 | 516000 | 547000 |
| Flexural strength, psi | 19900 | 19400 | 18700 | 16200 |
| Flexural modulus, psi | 481000 | 493000 | 525000 | 522000 |
| Tensile shear adhesion, psi[1] | 1980 | 2310 | 1366 | 747 |
| Peel strength, pli[2] | 2.5 | 2.1 | 2.0 | 1.7 |

[1]Cured 2 hrs 80° C., 3 hrs 125° C.
[2]Cured 2 hrs 110° C.

It will be understood that the foregoing examples are given by way of illustration only and not by way of limitation and that the scope of the present invention is defined solely by the appended claims.

What is claimed is:

1. A composition for use in the curing of a 1,2-epoxy resin comprising an alkylene carbonate solution of a normally solid cured elastomeric polyurethane in admixture with a primary amine curing agent.

2. A composition as in claim 1 wherein the elastomeric polyurethane is an elastomeric polyurethane formed by reaction injection molding and wherein the amine has the formula:

$$H_2NC_2H_4(HNC_2H_4)_nNH_2$$

wherein n is a number having a value of 0 to 5.

3. A composition as in claim 2 wherein the amine is diethylenetriamine.

4. A composition as in claim 3 wherein the alkylene carbonate is ethylene carbonate.

5. A composition as in claim 3 wherein the alkylene carbonate is propylene carbonate.

6. A method for the preparation of a composition useful in the curing of a 1,2-epoxy resin which comprises the steps of:
   a. heating an alkylene carbonate to a temperature of 100 to about 200 degrees C. and dissolving therein a soluble amount of a cured solid elastomeric polyurethane, and
   b. adding the resultant solution to a primary amine curing agent.

7. A method as in claim 6 wherein the polyurethane is a polyurethane prepared by reaction injection molding and wherein the amine is an amine having the formula:

$$H_2NC_2H_4(HNC_2H_4)_nNH_2$$

wherein n is a number having a value of about 0 to 5.

8. A method as in claim 7 wherein the amine is diethylenetriamine.

9. A method as in claim 8 wherein the alkylene carbonate is ethylene carbonate.

10. A method as in claim 8 wherein the alkylene carbonate is propylene carbonate.

11. A method for curing a 1,2-epoxy resin which comprises intimately mixing said epoxy resin with an effective amount of a primary amine curing agent comprising an alkylene carbonate solution of a normally cured solid polyurethane elastomer and a primary amine curing agent, whereby reaction of amino hydrogens of said amine with epoxy groups in said epoxy resin composition will result in the curing of said epoxy resin.

12. A method as in claim 11 wherein the said polyurethane is a polyurethane prepared by reaction injection molding and wherein the amine has the formula:

$$H_2NC_2H_4(HNC_2H_4)_nX$$

wherein n is a number having a value of 0 to 5.

13. A method as in claim 12 wherein the amine is diethylenetriamine.

14. A method as in claim 13 wherein the alkylene carbonate is ethylene carbonate.

15. A method as in claim 13 wherein the alkylene carbonate is propylene carbonate.

16. An epoxide resin composition prepared by curing a 1,2-epoxy resin with an epoxy curative comprising a primary amine curing agent admixed with an alkylene carbonate solution of a cured solid elastomeric polyurethane.

17. A composition as in claim 16 wherein the polyurethane is a polyurethane prepared by reaction injection molding, and wherein the amine is an amine having the formula:

$$H_2NC_2H_4(HNC_2H_4)_nX$$

wherein n has a value of 0 to 5.

18. A composition as in claim 17 wherein the amine is diethylene triamine.

19. A composition as in claim 18 wherein the alkylene carbonate is ethylene carbonate.

20. A composition as in claim 18 wherein the alkylene carbonate is propylene carbonate.

21. A method for preparing an epoxide resin composition which comprises the steps of:
   (a) heating an alkylene carbonate to a temperature of about 100° to 200° C.,
   (b) dissolving a primary amine curing agent and a soluble amount of a cured solid elastomeric polyurethane in said thus-heated alkylene carbonate,
   (c) to thereby provide an epoxy resin curing composition comprising a solution of said solid elastomeric polyurethane and said amine curing agent in said alkylene carbonate, and
   (d) mixing a 1,2-epoxy resin with an effective amount of said epoxy resin curing composition whereby reaction of amino hydrogens in said amine with epoxy groups in said epoxy resins will result in the curing of said epoxy resin.

22. An epoxide resin composition formed by curing a 1,2-epoxy resin with an epoxy resin curing composition comprising an alkylene carbonate having a primary amine curing agent and a cured solid elastomeric polyurethane dissolved therein, said epoxy resin curing composition having been prepared by heating said alkylene carbonate at a temperature of about 100° to about 200° C. and dissolving said amine curing agent and a soluble amount of said solid elastomeric polyurethane therein.

* * * * *